April 6, 1954     F. SCHAFER     2,674,282

MACHINE FOR CUTTING MATCH SPLINTS AND THE LIKE

Filed March 24, 1951     4 Sheets-Sheet 1

*INVENTOR.*
FRANK SCHAFER
BY
Richard P. Cardew
AGENT

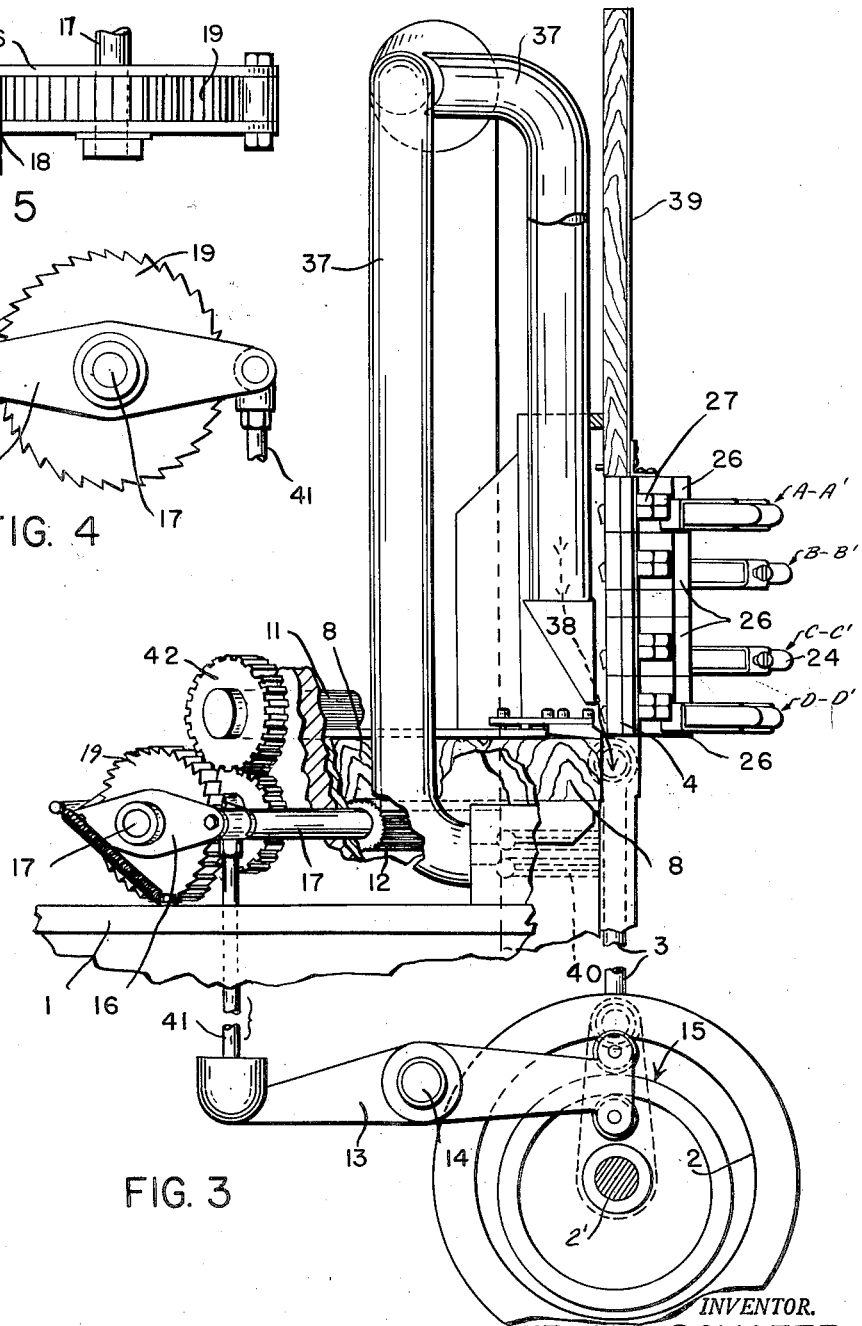

April 6, 1954  F. SCHAFER  2,674,282
MACHINE FOR CUTTING MATCH SPLINTS AND THE LIKE
Filed March 24, 1951  4 Sheets-Sheet 3

*INVENTOR.*
FRANK SCHAFER
BY
*Richard P. Cardew*
AGENT

*INVENTOR.*
FRANK SCHAFER
BY
Richard P. Cardew
AGENT

Patented Apr. 6, 1954

2,674,282

UNITED STATES PATENT OFFICE 2,674,282

MACHINE FOR CUTTING MATCH SPLINTS AND THE LIKE

Frank Schafer, Duluth, Minn., assignor to The Ohio Match Company, Wadsworth, Ohio, a corporation of Delaware Application March 24, 1951, Serial No. 217,363

7 Claims. (Cl. 144—164)

This invention relates to a machine for making match splints or the like.

In the match making industry there is a great deal of waste in the raw material from which splints are cut, and it is, therefore, one of my principal objects to provide a match splint making machine which will be able to use a larger percentage of the raw material brought to the mill.

Another object is to provide such a machine which will produce a larger percentage of good splints and materially fewer culls from a given quantity of wood.

Another object is to provide such a machine which cuts splints from relatively small blocks fed continuously thereto.

Another object is to provide match splint cutting means comprising a plurality of sets of blades arranged in a predetermined manner for separating splints from the face of a block of wood by slitting the latter grainwise.

Another object is to so cut the match splints from the block of wood that the cutter blades or other parts of the machine do not become clogged.

Another object is to provide positive means for feeding the blocks to the desired cutting position, and means for holding the blocks in cutting position for the cutting operation.

These and other objects and advantages of my invention will become more apparent as the description of my invention proceeds.

In the accompanying drawings forming a part of this application:

Fig. 3 is a fragmentary sectional side elevational view of Fig. 1;

Fig. 4 is an enlarged side view of the block advancing gear;

Fig. 5 is a top view of Fig. 4;

Figure 10:
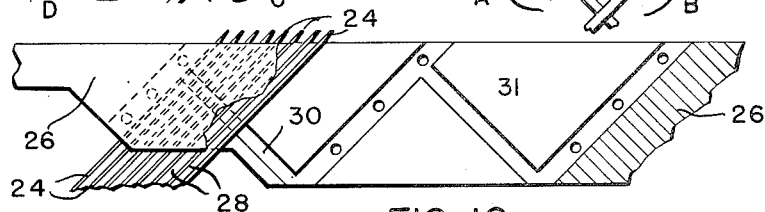
Figure 11:
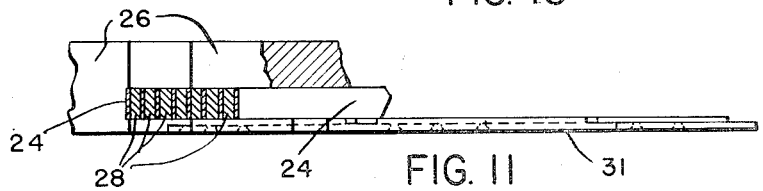
Figure 12:
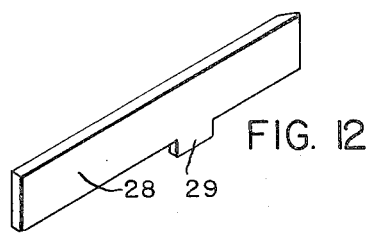
Figure 13:
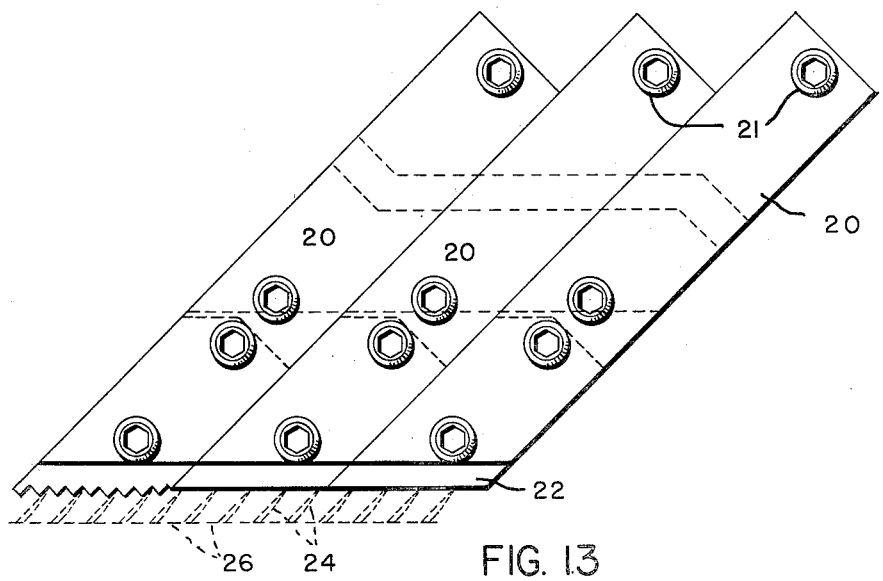
Figure 14:
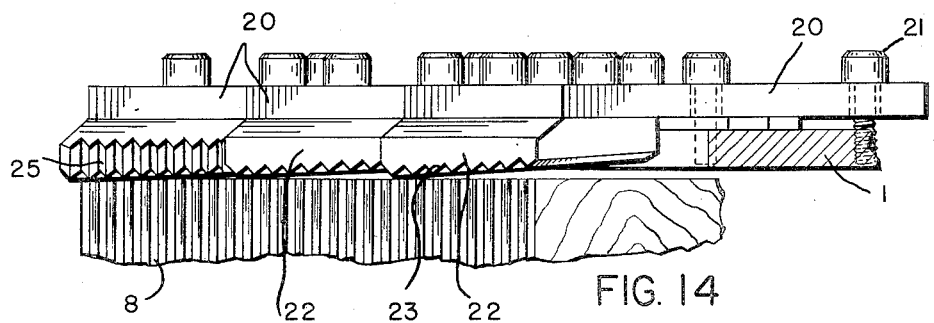
Figures 15, 16:
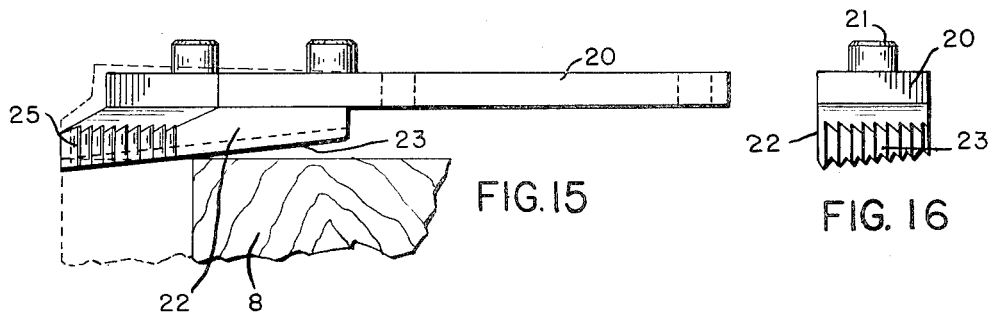

Figs. 6, 7, 8, and 9 are further enlarged fragmentary top plan views illustrating the progression of splint cutting by the blades;

Fig. 10 is a fragmentary plan view of a knife block;

Fig. 11 is a front view of Fig. 10;

Fig. 12 is a perspective view of one of the blade spacers;

Fig. 13 is a top plan view of the block hold-down means;

Fig. 14 is a front view of Fig. 13;

Fig. 15 is a side view of Fig. 14;

Fig. 16 is a rear elevational view of one of the block hold-down springs.

In the drawings, the reference numeral 1 indicates the frame of my machine, the frame having a flywheel 2 rotatable with a main drive shaft 2' adjacent to the lower end thereof, the shaft 2' being driven by any suitable motor, not shown, as by V-belt or the like.

Pivotally connected with crank arms on the main drive shaft 2' of the flywheel 2 at opposite sides of the machine are operating arms 3—3, the opposite ends of these arms 3—3 being pivotally secured to a vertically reciprocable cross head 4. The cross head 4 has a vertical guide 5 extending from each side thereof into a complementally shaped vertical slide or groove 6 in the frame 1, as shown, whereby the cross head is guided in its vertical reciprocating movement imparted by the operating arms 3 when the shaft of the flywheel is rotating. This broad mechanical arrangement is old in the art and, it is deemed, needs no further detailed description herein.

The frame of the machine also carries the block troughs, of which I have here shown two, 7 and 7', side by side, these block troughs being of suitable width to receive and guide relatively small wooden blocks 8 from which splints are to be cut such blocks being of a thickness, grainwise, equal to the predetermined desired length of a finished splint. The bottom of each trough 7 preferably has a strand of an endless conveyor belt 9 therein which is continuously driven, as indicated by the arrow, to move blocks into the machine toward the crosshead 4. The machine operator places the blocks on the conveyor 9, of course, to be carried into the machine.

At the end of the conveyor 9, a knurled roller 10 continuously driven, preferably by chain and sprocket gearing 10' from a pulley shaft of the drive of the belts 9 engages the blocks 8 and moves them into the machine, maintaining a constant inward bias on the blocks even when the latter are held from inward movement by other means, to be described. Thus the roller 10 serves to keep the blocks in the machine tightly against each other for more efficient operation.

Inwardly from the roller 10, pairs of ribbed or toothed rollers 11—11 and 12—12 are provided, one above the trough and one extending into the lower portion thereof. These rollers firmly engage the blocks, their ribs or teeth being relatively sharp to insure a good grip thereon. The rollers 11—11 and 12—12 remain stationary during most of the cutting cycle, and are rotated just slightly once during each cycle, the amount of rotation being just enough to move the blocks forward the required distance to permit one row of splints to be sliced or cut therefrom.

The intermittent rotation of the rollers 11 and 12 is accomplished by means of the cam operated arm or lever 13 which is pivoted intermediate its ends as by a pin 14 on the frame of the machine, the flywheel 2 having a cam surface 15 thereon to reciprocate the lever 13 once on each revolution thereof. A link arm 41 is connected from the lever 13 to a second lever 16 which is pivoted intermediate its ends, preferably on the shaft 17, as shown. At the opposite end of the lever 16 a pivotal dog 18 is provided which engages the ratchet wheel 19 to rotate same one cog or tooth with each revolution of the flywheel 2. The shaft 17 extends into the machine, see Fig. 3, and has the lower roller 12 mounted thereon, as shown, and thereby this roller is rotated when the ratchet wheel 19 is rotated. The rollers 11—11 have a gear train 42—43—44, as shown, connecting them with the shaft 17 so that the rollers 11—11 will be rotated simultaneously with and in the same direction as the rollers 12—12 to advance the blocks one step at a time.

When the blocks are advanced past the rollers 11 and 12, they engage the metal block hold-down springs 20—20 which are clearly shown in Figs. 13-16. As shown, these springs are secured to the frame by bolts 21—21, and have foot members 22 at their free ends, the foot members having a downwardly inclined and grooved lower face 23, as shown. Fig. 15 illustrates how a block 8 engages the inclined face 23, and as it is pushed forward it raises the spring 20 against its inherent spring qualities. The grooves in the face serve to hold the block 8 from twisting or turning in the block trough as it moves ahead to be cut.

As seen in Fig. 13, the block hold-down springs extend almost to the cutter blades 24—24, the latter clearing the hold-downs by the necessary few thousandths of an inch. The foot member 22 on the extreme left is shown as being grooved on its outer face, as at 25, so that the blades extend into the grooved areas, the purpose of this being to provide a more secure and extended hold on the very small corners or end pieces of each block which are cut in this area.

We have, as above described, moved the small wooden blocks 8 through the block trough 7 under the block hold-down springs 20 to the cutters 24. Here the important features of my invention become apparent.

Figure 1:
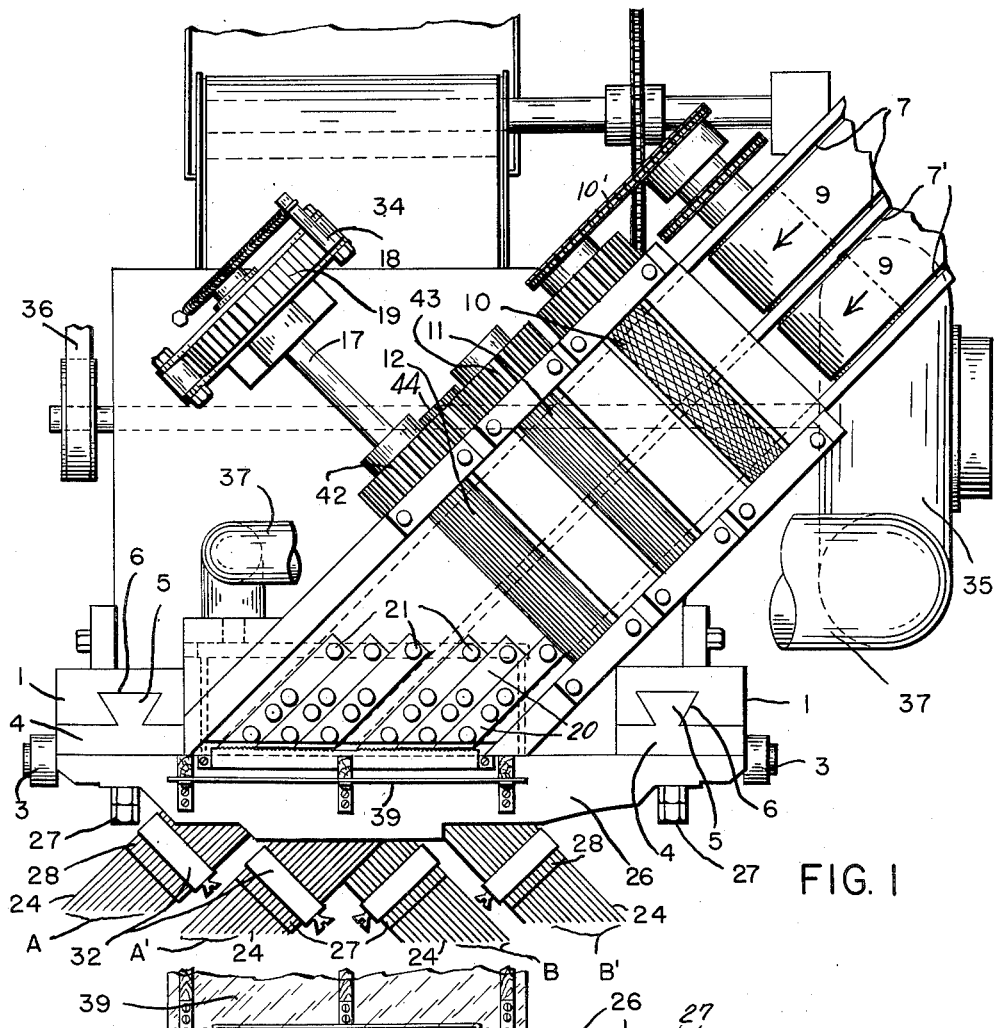
Fig. 1 is a broken top plan view of one of my splint making machines.
Figure 2:
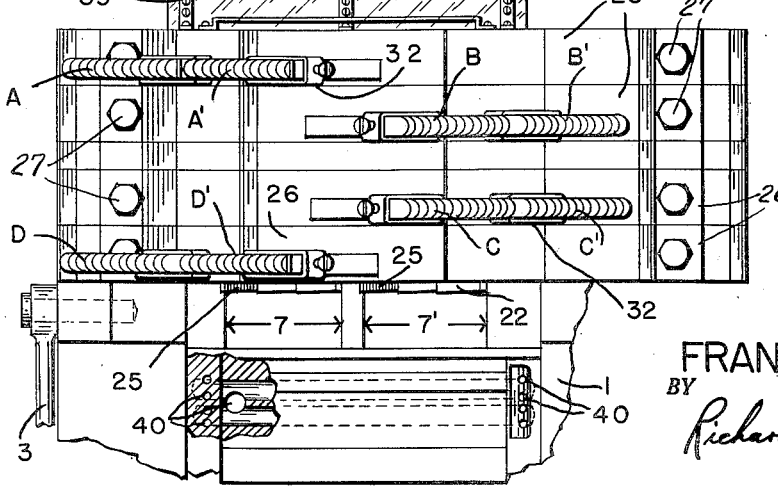
Fig. 2 is a fragmentary front elevational view of Fig. 1.
Figure 6:
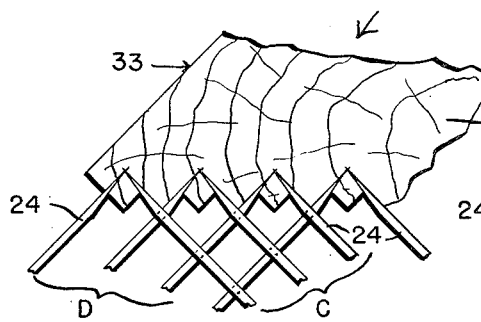
Figure 7:
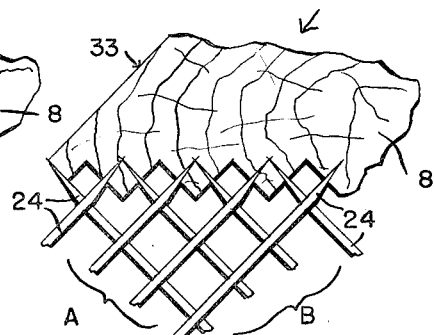
Figure 8:
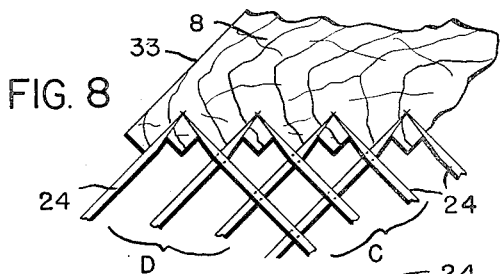
Figure 9:
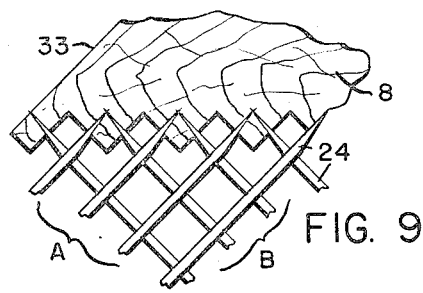

I have arranged a plurality of blades 24 in a plurality of groups or sets, A, B, C, D, and A', B', C', D' (Figs 1 and 2). The sets A, B, C, and D operate on blocks 8 in the trough 7 and the sets A', B', C', and D' operate on blocks 8 in the trough 7'. It is deemed unnecessary to describe the operation of each of the troughs and their cutters or blades 24, as both are preferably identical.

The blades or cutters 24—24 are carried in knife blocks 26—26 which are shown in Figs. 1, 2, 3, 10, and 11 of the drawings. The knife blocks are secured to the cross head 4 as by bolts 27—27 on each side thereof and are mounted one above the other, there being four knife blocks here shown, each having two sets of blades mounted therein, one set to cut or operate on blocks 8 in each of the block troughs. As shown in the drawings, the blades 24 are elongated thin strips of metal having one end edge thereof sharpened. The sharpening of the blades being done on one side thereof as shown, and the major portion of the blade end preferably being cut and sharpened at an angle as seen in Figs. 3 and 11, a slicing action is obtained when the blades are moved through the blocks 8. The blades are placed in the knife blocks 26 in spaced parallel relation with their sharpened ends protruding equidistant from the face of the knife blocks, as shown. Suitable means are employed to maintain the blades 24 in their desired spaced relation, wherein the blades are spaced apart the cross-sectional thickness of two match splints, there being spacer blocks 28—28 of suitable concomitant thickness mounted between the blades, as shown.

Each of the spacer blocks preferably has a lug 29 extending downwardly therefrom which rides in a groove 30 in the bottom plate or cover member 31 of the knife block to prevent their moving out of place; that is, to maintain their outer ends in alinement with the inner faces of the knife blocks (Figs. 10 to 12). The blades 24 do not have this lug, as it is desirable to be able to adjust the position of the blades to compensate for blade shortening due to sharpening.

The knives are mounted in the knife blocks in sets or groups, as stated previously, and are preferably mounted at an angle in the blocks, as shown, one half of the sets being arranged at a 45° angle in the blocks facing in one direction, and the other half of the sets being arranged at a 45° angle in the blocks facing in the opposite direction, as shown, whereby the sets of blades are disposed at right angles to each other. The blades are clamped in place by the bottom plate or cover member 31 (Fig. 10) across the major portion thereof, and the outer ends of the blades are clamped in suitable screw clamps 32 (Figs. 1, 2 and 3) to hold them securely in place. As shown, the sets of blades A and A' are in the uppermost knife block, B and B' in the next lower, etc., each of the sets A, A', D and D' being faced in one direction, and the sets B, B', C and C' in the opposite direction.

By referring to Figs. 2 and 6-9, it will readily be seen that the sets of blades A and D, while they face in the same direction and are disposed one above the other, have their blades in offset relation; that is, the blades, as aforesaid, are spaced apart the thickness of two match splints; however, the blades D are arranged to cut exactly medially between the cuts of the blades A, thereby providing for cutting or slitting the face of the block 8 at each splint width. Likewise, the blades of sets C and D are arranged to cut in between each other's cuts.

This arrangement permits the blades to slice through the wood more readily, as there is more room for the wood to compress or move away from a blade as it passes through the wood. If the blades were set only one splint thickness apart, there would be greater resistance to slicing movement of the cutters through the block, as there is a normal tendency for the wood to jam or catch between the knives and thereby clog the cutters.

As above described, the knife blocks are secured to the cross head 4 and the latter is vertically guided by the guides 5 and slides 6 while being reciprocated by the drive shaft 2' and operating crank arms and rods, and hence, the knives or blades are vertically reciprocated with the cross head 4. The blocks 8 from which splints are cut are placed in the block troughs with their grain vertically disposed, and have been described as moved through the trough to be held by the spring hold-downs 20 with a slight portion of the face of the block extending beyond the trough bottom and foot members 22. The portions of the blocks thus exposed for slitting by the knives to form splints, as hereinafter explained, will therefore be of a height, grainwise, equal to the predetermined length of the finished splints, and of a depth, laterally, slightly greater than the predetermined thickness of such splints. The blades have also been described as extending to within a few thousandths of an inch of the members 22, see Fig. 13. Thus, it will be seen that when the cross head is reciprocated vertically, the blades 24 of each of the sets A, B, C, and D will engage the slightly extending upper exposed face of the block 8 and slice through the block face from top to bottom while the block is rigidly held in the block trough 7 (the sets A', B', C', and D' doing the same to blocks in the trough 7', of course).

The troughs 7—7' are here shown as being disposed at a 45° angle to the working face of the knife blocks, which places the sets of knives A and D in alinement with the troughs so as to cut in line with the straight side wall 33 (Figs. 6 to 9) of the block 8 as shown, thereby eliminating waste of any wood along the wall 33 of the blocks.

The blades B and C are angled at right angles to the blades A and D and to the trough 7 so as to cut a square splint from the block. Each of these sets of blades passes through the block on each downward movement of the cross head (Figs. 6 to 9), the set D first slitting into the block to a depth slightly greater than the thickness of a match splint. The set C then cuts through the block at right angles to the cut of the set D and to about the same depth as the latter cut, taking out every other splint along the face of the block. The set B then passes through, slitting intermediate the cuts made by the set C. The set A then comes through at right angles to the set B and takes out the remaining splints. The cross head and knives then return to their upper position. However, just before the cross head reaches the upper limit of its stroke, the cam 15 engages the end of the arm 13 and moves same upwardly a distance sufficient to move the blocks 8 forward one notch in the manner above described to permit another set of splints to be cut from the face of the leading block in the same manner.

As the splints are sliced off of the block, it is desired that they move downwardly on to a suitable belt conveyor 34 which will carry them to a receptacle or other depository. I have provided a blower 35 driven by a V-belt 36 from any suitable motor, not shown. Conduits or pipes 37 are provided to direct air from the blower to a discharge point 38 immediately over the block trough adjacent to the cutting point, see Fig. 3. The air is, of course, directed downwardly to force the splints downwardly on to the conveyor. The air is discharged into a confined space with its only discharge downwardly, the front of the enclosed space being closed with a transparent sheet of plastic or glass 39 so that the progress of the operation may be watched therethrough as the cross head reciprocates, the glass 39 being secured to and traveling with the cross head and its appurtenances, and having a suitable sliding air seal, not shown, to permit such operation.

I also prefer to direct some of the air from the blower 35 through suitable passages 40 in the frame 1 to discharge on to the cutters or blades 24, thereby to blow any splints therefrom which may have been caught on or between the blades.

The foregoing detailed description has been given for clearness of understanding only, and no unnecessary limitations should be understood therefrom, and the appended claims should be construed as broadly as permissible in view of the prior art.

Having thus described my invention, what I claim is:

1. In a machine for cutting splints from blocks of wood, means for holding a block in a position to be slit, a head carried adjacent to said means and being movable before said block, and a plurality of blades carried by said head in predetermined spaced relation to each other to engage and slit the face of said block as said head is moved before same, said blades having their cutting edges disposed in substantially the same plane and said blades being combined in a plurality of groups, one half of said groups being disposed substantially at right angles to the other half of said groups whereby substantially square splints may be cut from the face of said block.

2. The machine as set forth in claim 1 and said groups being spaced apart in the direction of movement of said head whereby they engage said block successively.

3. A machine for cutting splints from a block of wood comprising: a frame, means on said frame for moving blocks of wood to a cutting position, means to hold said blocks in said cutting position, a head carried on said frame and being movable before said cutting position, means to move said head before said cutting position, a plurality of blades carried by said head and arranged in groups, the blades of said groups respectively being arranged substantially at right angles to each other and all of said blades having their cutting edges disposed substantially in alinement with the direction of movement of said head, said blades upon movement of said head serving to engage and progressively slit said block in intersecting planes when the block is in said cutting position to thereby separate splints therefrom.

4. The structure as set forth in claim 3 and means for advancing said blocks into said cutting position step by step with a dwell between steps.

5. In a machine for cutting splints from blocks of wood, means for holding a block in position to be slit, a head carried adjacent to said means and being movable before said block, and blades carried by said head and arranged in groups, said groups being in spaced relation in the direction of movement of said head, means interposed between and serving to space the blades of each group in predetermined relation to each other, and the blades of one of said groups having their cutting edges substantially at right angles to the cutting edges of the blades of the other group, the blades of said groups serving respectively to successively engage and progressively slit the face of said block in intersecting planes as said head is moved before same.

6. In a machine for cutting match splints from blocks of wood, means for holding a block in position to be slit, a head carried adjacent to said means and being movable before said block, and blades carried by said head and arranged in at least four groups, said groups being in spaced relation in the direction of movement of said head, the blades of two of said groups having their cutting edges arranged substantially at right angles to the cutting edges of the blades of the other two groups, means interposed between the blades of each group and serving to space them from each other a distance substantially equal to twice the thickness in cross section of a splint to be cut, and means for mounting the thus spaced blades of one group of each of said two groups so that they will cut substantially medially with respect to the blades of the other group of each of said two groups, said blades serving to successively engage and progressively slit the face of said block in intersecting planes as said head is moved before the block.

7. In a machine for cutting match splints from blocks of wood, means defining a cutting station including a cutter head mounted for reciprocative movement and stationary block holding means adjacent to said head, means for imparting reciprocation to said head whereby it is moved before said block holding means, means actuated in timed relation to the reciprocation of said head for advancing blocks to said holding means with a step-by-step travel to present them to said cutter head, a plurality of cutter blades carried by said head, said blades being arranged in groups and being relatively spaced in such groups, and having cutting edges which are positioned in the respective groups substantially at right angles to each other, said groups being mounted in said head in spaced relation in the direction of its reciprocation, and reciprocative movement of said head serving to cause said blades to engage and progressively slit in intersecting planes the face of a block positioned at said cutting station to thereby cut from said block a plurality of splints at a single reciprocative stroke of said head.

References Cited in the file of this patent

UNITED STATES PATENTS

| Number | Name | Date |
|--------|------|------|
| 169,246 | Fagley | Oct. 26, 1875 |
| 238,467 | Wilson | Mar. 1, 1881 |
| 295,173 | Hill | Mar. 18, 1884 |
| 335,516 | Flewwelling | Feb. 2, 1886 |
| 420,902 | Dougherty | Feb. 4, 1890 |
| 507,503 | Naylor | Oct. 24, 1893 |
| 833,382 | Greif | Oct. 16, 1906 |
| 885,254 | Hutchinson | Apr. 21, 1908 |
| 953,359 | Tainter et al. | Mar. 29, 1910 |
| 987,174 | Schafer | Mar. 21, 1911 |
| 1,506,850 | Mange | Sept. 2, 1924 |
| 2,349,034 | Elmendorf | May 16, 1944 |